United States Patent
Wise et al.

(10) Patent No.: US 8,116,340 B2
(45) Date of Patent: Feb. 14, 2012

(54) QUADRATIC NONLINEARITY-BASED HIGH-ENERGY PULSE COMPRESSOR FOR GENERATING FEW-CYCLE PULSES

(75) Inventors: Frank W. Wise, Ithaca, NY (US); Jeffrey A. Moses, Cambridge, MA (US)

(73) Assignee: Cornell University, Ithaca, NY (US)

( * ) Notice: Subject to any disclaimer, the term of this patent is extended or adjusted under 35 U.S.C. 154(b) by 284 days.

(21) Appl. No.: 12/276,570

(22) Filed: Nov. 24, 2008

(65) Prior Publication Data
US 2010/0020834 A1 Jan. 28, 2010

Related U.S. Application Data

(63) Continuation of application No. PCT/US2007/012306, filed on May 24, 2007.

(60) Provisional application No. 60/802,763, filed on May 24, 2006.

(51) Int. Cl.
*H01S 3/10* (2006.01)
(52) U.S. Cl. .............................. 372/21; 372/22; 372/25
(58) Field of Classification Search ............. 372/21, 372/22, 25
See application file for complete search history.

(56) References Cited

U.S. PATENT DOCUMENTS
5,659,561 A * 8/1997 Torruellas et al. ............. 372/22

OTHER PUBLICATIONS

Mollenauer, "Extreme picosecond pulse narrowing by means of soliton effect in single mode optical fibers," Optics Letters, vol. 8, 289-291 (1983).*
Ashihara, "Soliton compression of femtosecond pulses in quadratic media," J. Opt. Soc. Am. B, vol. 19, 2505-2510 (2002).*
S.Ashihara, J.Nishina, T,Shimura, K.Kuroda; Soliton compression of femtosecond pulses in quadratic media, (2002), Optical Society of America 19 (10): 2505.
F.Ilday, K. Beckwitt, Y.Chen, H.Lim, F.Wise; Controllable Raman-like nonlinearities from nonstationary, cascaded quadratic processes, (2004), Optical Society of America 21 (2): 376.
X.Liu, L.Qian, F.Wise; High-energy pulse compression by use of negative phase shifts produced by the cascade X(2):X(2) nonlinearity, (1999), Optical Society of America 24 (23): 1777.

* cited by examiner

*Primary Examiner* — Jessica Stultz
*Assistant Examiner* — Michael Carter
(74) *Attorney, Agent, or Firm* — William A. Blake

(57) ABSTRACT

A pulse compressor for compressing many-cycle femtosecond-duration high-energy pulses to near-single-cycle durations uses a single quadratic nonlinear crystal. A pulsed laser beam is controlled and its passage is aligned through the quadratic nonlinear crystal such that the detrimental effects of group-velocity mismatch are avoided, while still allowing enough nonlinear phase accumulation for compression to near-single-cycle pulse durations. To do so, the perturbation to nonlinear Schrödinger-type soliton compression due to group-velocity mismatch is minimized which requires that the soliton order must not exceed an optimal value set by the amount of group-velocity mismatch.

5 Claims, 1 Drawing Sheet

QUADRATIC NONLINEARITY-BASED HIGH-ENERGY PULSE COMPRESSOR FOR GENERATING FEW-CYCLE PULSES

CROSS REFERENCE TO RELATED APPLICATIONS

This application is a continuation under 35 U.S.C. 120 and 365(c) of International Application No. PCT/US2007/012306, which was filed on May 24, 2007, designates the U.S. and claims the benefit under 35 U.S.C. 119(e) of U.S. Provisional Application No. 60/802,763, filed May 24, 2006, which is hereby incorporated by reference in its entirety.

GOVERNMENT SPONSORSHIP STATEMENT

This invention was made with government support under National Science Foundation Contract Nos. ECS-0217958 and PHY-0099564. The US government has certain rights in this invention.

BACKGROUND OF THE INVENTION

1. Field of the Invention

The present invention relates in general to a pulse compressor for compressing many-cycle femtosecond-duration high-energy pulses to near-single-cycle durations using a single quadratic nonlinear crystal.

2. Description of the Background Art

High-energy, short-pulse sources are needed to study high-intensity interactions of light with matter, a fact which has driven the development of pulse compression techniques to improve upon the limits of high-power lasers. Noble-gas filled hollow waveguide compressors can generate near-single-cycle pulses with energies of about a millijoule. Recently another approach has emerged, where the waveguide is replaced by the self-guiding of filamentation in gas. The new technique has many advantages over the old, but shares its limitation to energies of a few millijoules, due to multiple filamentation at powers much above the critical power for self-focusing.

In contrast, compression based on self-defocusing nonlinearities in quadratic media has no fundamental limit to its scalability. It is simple and efficient. It employs the cascaded quadratic nonlinearity ($\chi^{(2)}:\chi^{(2)}$), a phenomenon which produces Kerr-like nonlinear phase shifts of controllable sign and magnitude. Negative nonlinear phase shifts generate new frequency components, which are brought into phase with one another by normal dispersion, either in a subsequent stage, or by soliton effect (i.e., with propagation ended partway through the first N-soliton period). Because the propagation is spatially unguided, scaling to higher energies simply requires increasing the beam size in order to maintain appropriate intensity. Thus, energy-scaling is limited only by the availability of suitably large-aperture quadratic nonlinear crystals.

At present, single crystals are commercially available that can accommodate pulse energies up to ~100 millijoules for self-defocusing based compression. Higher energies may possibly be accommodated by engineering two-dimensional crystal arrays. To date, however, the method has been limited to the generation of many-cycle pulses. This limitation is due to the group-velocity mismatch (GVM) between the fundamental (FF) and second-harmonic (SH) fields coupled in the nonlinear process. Until now, GVM has been seen as an insurmountable obstacle to generating few-cycle pulses with quadratic nonlinear crystals.

SUMMARY OF THE INVENTION

The present invention comprises a pulse compression technique using soliton effect with self-defocusing cascaded-quadratic nonlinearities, which overcomes the foregoing limitation due to GVM. As a result, the invention enables compression of many-cycle femtosecond-duration high-energy pulses to near-single-cycle durations using only a single quadratic nonlinear crystal. Through extensive analysis and experimentation, the inventors have discovered that if the operational parameters of the compressor are selected to have a specific relationship with one another, then the detrimental effects of group-velocity mismatch are avoided, while still allowing enough nonlinear phase accumulation for compression to near-single-cycle pulse durations. Through use of the inventive technique, a five fold or more increase in pulse compression can be obtained over what was previously thought possible or demonstrated with a quadratic nonlinear crystal-based pulse compressor.

The crucial feature of the invention is that it minimizes the perturbation to nonlinear Schrödinger-type soliton compression due to group-velocity mismatch. The conditions for which group-velocity mismatch causes an acceptable perturbation to soliton compression underlie optimization of the compressor. In particular, the soliton order must be maximized to maximize the pulse compression ratio, but at the same time, the soliton order must not exceed an optimal value set by the amount of group-velocity mismatch. Using this optimal value for soliton order, the inventors have surprisingly discovered that compression to near-single cycle duration is possible.

The optimum value for the soliton order, N, is dependent on a number of parameters including intensity of the incident laser beam, GVM of the crystal material, initial pulse duration, and wavevector mismatch. Ideally, the GVM of the chosen crystal should be as small as possible. Wavevector mismatch should be set as large as possible (while still maintaining a large, self-defocusing type nonlinearity). With wavevector mismatch chosen, the intensity remains as the only experimental parameter (the compressor length is determined by the soliton order.) Thus intensity is used to experimentally control the soliton order. With GVM, initial pulse duration, and wavevector mismatch chosen, there exists a maximum soliton order $N_{MAX}$ for which the Raman-like perturbation due to GVM will not be too large. This maximum soliton order determines the compression ratio, and for given initial pulse duration, the smallest possible compressed pulse duration. Thus, for achieving maximum compression the soliton order should be set to $N_{MAX}$.

BRIEF DESCRIPTION OF THE DRAWINGS

The features and advantages of the present invention are set forth in the following detailed description of a preferred embodiment thereof, taken in conjunction with the accompanying drawings, which are briefly described as follows.

FIG. 2A shows numerical calculations of soliton compression of 200-fs Gaussian pulses in cubic ($\chi^{(3)}$) and quadratic ($\chi^{(2)}$) media, illustrating the Raman-like GVM-induced distortions in the quadratic case at large N. The y-axis indicates peak power of the compressed pulse relative to that of the input. FIG. 2B shows the temporal profile at optimum N for the quadratic case and FIG. 2C (ii) shows undesirable typical features of the temporal profile beyond optimum N, such as a large asymmetric pedestal, reduced peak power and soliton splitting.

DETAILED DESCRIPTION OF THE PREFERRED EMBODIMENT

Figure 1:
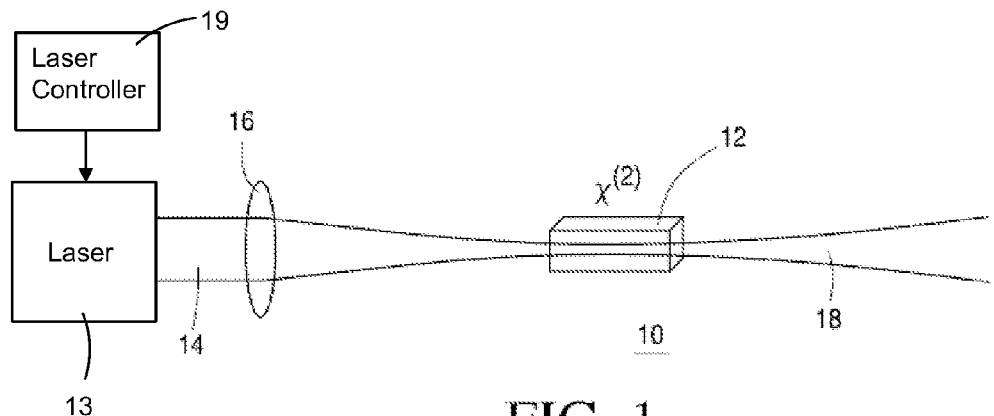
FIG. 1 is a schematic diagram of pulse compressor configured in accordance with a preferred embodiment of the present invention.

With reference to FIG. 1, a pulse compressor 10 is illustrated which can be configured in accordance with the operational parameters of the present invention to provide optimal compression of pulses to single and few cycle durations. The pulse compressor 10 is formed from a single quadratic nonlinear crystal 12, which is also often referred to as a frequency-doubling crystal. The crystal 12 is formed from any suitable nonlinear material such as barium metaborate (BBO), bismuth borate (BiBO), potassium titanyl phosphate (KTP), lithium iodate ($LiIO_3$), lithium niobate ($LiNbO_3$), periodically-poled lithium niobate (PPLN), potassium niobate ($KNbO_3$) and lithium triborate (LBO). An input optical pulse 14 is fed from a suitable source, such as a laser 13, passes through a focusing lens 16 and then is directed through the quadratic nonlinear crystal 12, which forms a compressed output pulse 18. The intensity of the laser 13 is controlled by a laser controller 19.

As stated previously, pulse compression using a single quadratic nonlinear crystal is known. However, the key to the present invention lies in the heretofore unknown operational parameters that are employed with the pulse compressor 10 and have been discovered to provide surprisingly improved compression of pulses down to nearly single pulse duration. More specifically, the invention is the discovery of conditions for which GVM is an acceptable perturbation to soliton compression. This allows one to find conditions for clean, efficient pulse compression to durations near a single optical cycle, using only a single crystal of available quadratic media. To identify these conditions, the coupled wave equations for coupled FF and SH fields in BBO were first solved by means of the split-step Fourier technique. Terms for quadratic nonlinearity, cubic nonlinearity, group-velocity dispersion, third-order dispersion and GVM were included.

More specifically, the cascade process is modeled by a set of coupled envelope equations for the FF and SH fields, $$i\frac{\partial A_1}{\partial z} - \frac{k_1''}{2}\frac{\partial^2 A_1}{\partial T^2} + \Gamma_1 A_1^* A_2 e^{-i\Delta kZ} \qquad (1), (2)$$

$$i\frac{\partial A_2}{\partial z} - i\delta\frac{\partial A_2}{\partial T} - \frac{k_2''}{2}\frac{\partial^2 A_2}{\partial T^2} + \Gamma_2 A_1^2 e^{i\Delta kZ}$$

where $A_1$ and $A_2$ are the FF and SH field envelopes, Z and T are spatial and temporal coordinates in the frame of the FF pulse, $\Delta k$ is wavevector mismatch, and $k''_i$, $\Gamma_i$, and $\delta$ characterize group-velocity dispersion (GVD), quadratic nonlinear response, and GVM, respectively. Analysis of these equations shows that at the limit of infinite $\Delta k$ the FF experiences an effect identical to the electronic Kerr effect. For finite $\Delta k$, however, GVM delays or advances energy transfer between the FF and SH, distorting the nonlinear phase shifts. Generally, the smaller the $\Delta k$ and pulse duration, the stronger the distortions. Since the magnitude of the phase shift is inversely proportional to $|\Delta k|$, GVM determines a minimum pulse duration below which only uselessly-small or heavily-distorted phase shifts can be generated.

In "Controllable Raman-like Nonlinearities from Non-stationary Cascaded Quadratic Processes," (J. Opt. Soc. Am. B 21, 376 (2004)) Ilday et al. compared the distortions due to GVM to those of a non-instantaneous component of a cubic nonlinearity, and used this comparison to explain soliton self-frequency shift- (SSFS-) like behavior in cascade propagation. Their approximate single-field equation for the FF, derived from Eqs. (1) and (2), is a nonlinear Schrödinger equation (NLSE) perturbed by a Raman- or self-steepening-like term, an equation extensively studied in the context of cubic media. This equation is written for the case of self-defocusing nonlinearity and normal GVD in units of the soliton order, $N=(L_{DS}/L_{NL})^{1/2}$, where $L_{DS}=\tau_0^2/k''_1$, $L_{NL}=\Delta k/\Gamma_1\Gamma_2 P_0$, $\alpha_1=A_1/P^{1/2}_0$, $\tau=T/\tau_0$ and $\xi=z/L_{DS}$, with $\tau_0$ and $P^{1/2}_0$ the initial pulse duration and field amplitude, respectively, $$i\frac{\partial a_1}{\partial \xi} - \frac{1}{2}\frac{\partial^2 a_1}{\partial \tau^2} - N^2|a_1|^2 a_1 = -N^2\tau_R|a_1|^2\frac{\partial a_1}{\partial \tau}. \qquad (3)$$

The effective Raman response time is $\tau_R=2i\delta/\Delta k\tau_0$, which together with $N^2$ determines the coefficient of the Raman-like perturbation. As is known from the theory of cubic SSFS, the inherent stability of NLSE solitons allows the perturbation to be large without strongly affecting soliton dynamics. However, at large enough bandwidth the Raman gain becomes substantial and large frequency shifts and temporal distortions are observed. Therefore, to avoid such effects in soliton compression while maximizing compression ratio, one should choose $N=N_{max}$, such that the total spectral broadening accumulated by the time the pulse has reached its final compressed duration corresponds to the spectral width when the Raman gain becomes large. To achieve near-single-cycle durations, the right-hand side (RHS) of Eq. (3) must not become large until bandwidths approaching an octave are generated.

Figure 2A:
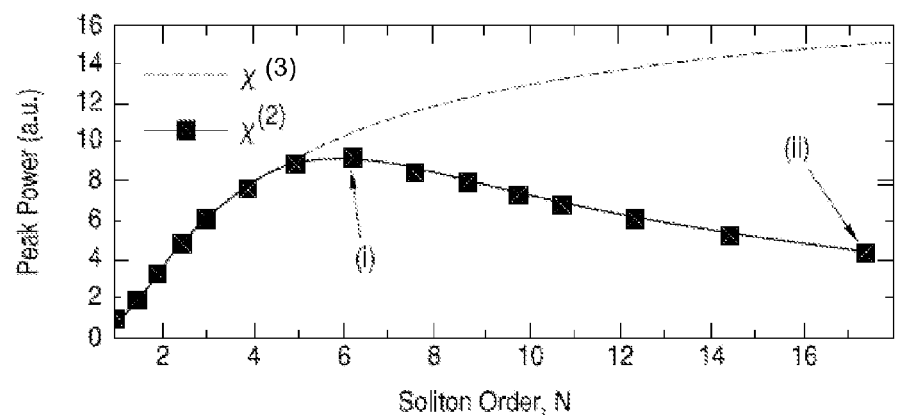
FIGS. 2A-2C are graphs which demonstrate how the operational parameters of the pulse compressor of FIG. 1 are optimized to obtain few cycle pulses as output.
Figures 2B, 2C:
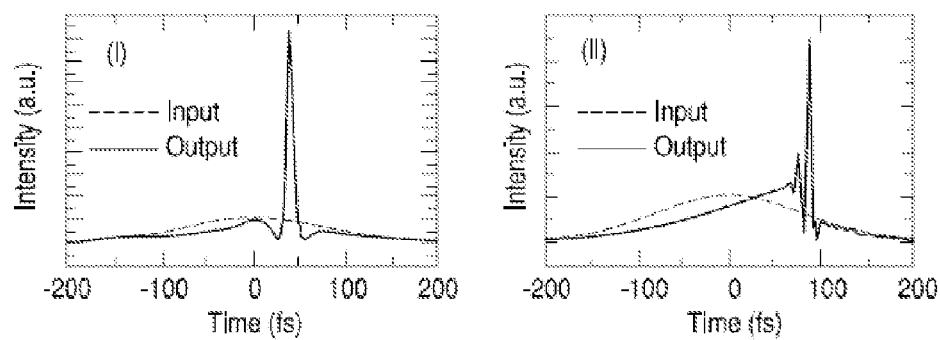

FIG. 2A compares numerical calculations of soliton compression in cubic and quadratic media, plotting peak power versus N. The cubic case uses a single NLSE while the quadratic case employs the coupled field equations, Eqs. (1), (2). In neither case is a Raman term included explicitly; however, a Raman-like effect arises naturally in the quadratic case due to the GVM. For $N\leq 5$ (i.e., small RHS in Eq. (3)), the curves overlap. However, for $N>5$, increases in peak power due to further compression are outweighed by loss of energy to the pulse pedestal due to Raman-like distortions. The peak of the $\chi^{(2)}$ curve deviates only slightly from the unperturbed $\chi^{(3)}$ case, and represents the optimum, $N_{max}$.

In view of the foregoing, the following conditions are required for "few-cycle" duration or better compression in a cascaded quadratic soliton compressor. First, to obtain self-defocusing-type phase shifts, the sign of the wavevector mismatch between fundamental and second-harmonic wavelengths must be chosen accordingly; the magnitude of the nonlinear phase shifts generated by cascaded quadratic processes must be larger than the magnitude of nonlinear phase shifts generated by cubic nonlinear processes. This ensures that the total phase shifts are negative in sign. To achieve this, the quadratic nonlinear coefficient $d_{eff}$ must be large enough compared to the cubic nonlinear coefficient $n_2$; the magnitude of the wavevector mismatch must not exceed a value set by the $n_2$ (since cascaded quadratic phase shifts are inversely proportional to wavevector mismatch).

In order to achieve few-cycle compressed pulses, group-velocity mismatch (GVM) must not create a large Raman-like perturbation to the effective nonlinear Schrödinger equation that governs soliton compression. This perturbation becomes large when initial pulse duration is short; GVM is large;

wavevector mismatch between fundamental frequency and second-harmonic is small; soliton order is large; intensity is high; and pulse bandwidth is broad. For practical implementations of the subject compression technique, initial pulse duration is given by the application and GVM is set by choice of material. Soliton order determines compressed pulse duration, and is therefore dictated by the application. Intensity and wavevector mismatch are experimental parameters for controlling the soliton order. Pulse bandwidth increases during propagation in the compressor. Initial bandwidth is determined by the initial pulse duration and maximum bandwidth is determined by the soliton order. Thus, pulse bandwidth is fully determined by the parameters of the application.

The conditions above thus necessitate the following technique for achieving pulse compression to few-cycle durations. A nonlinear crystal material must be picked for which GVM is as small as possible at the fundamental wavelength. Wavevector mismatch should be set as large as possible (while still maintaining a large, self-defocusing type nonlinearity). With wavevector mismatch chosen, the intensity remains as the only experimental parameter (the compressor length is determined by the soliton order.) Thus intensity must be used to experimentally control the soliton order. With GVM, initial pulse duration, and wavevector mismatch chosen, there exists a maximum soliton order $N_{MAX}$ for which the Raman-like perturbation due to GVM will not be too large. This maximum soliton order determines the smallest possible compressed pulse duration. Thus, for achieving maximum compression the soliton order should be set to $N_{MAX}$.

By simulating Eqs. (1), (2) for realistic experimental conditions, including third-order dispersion, self-steepening, cubic self-phase modulation and cross-phase modulation, near-single-cycle final durations and compression ratios as large as 100 are obtained. For example, a 500-fs pulse is compressed to 6.7 fs (2 optical cycles at 1.064-μm wavelength), or ~75× compression, after propagation in 6.25 cm of β-barium borate (BBO). In BBO, compressed pulse durations under two cycles are predicted for wavelengths between ~1.0 and ~1.35 μm, with initial pulse durations ranging from ~100 fs to as long as ~1 ps. At these wavelengths GVD is positive, and large enough for self-compression to occur over reasonable propagation lengths. Additionally, GVM is small enough that $N_{max}$ corresponds to few-cycle compressed pulse durations. Pulse quality is typical of high-order soliton compression. The empirical formulas found previously for cubic soliton compression can be used to analytically calculate experimental parameters such as propagation length and intensity. Typical experimental parameters are 2 to 10 cm of propagation, intensity between 50 and 200 GW/cm$^2$, and Δk between 10π/mm and 20π/mm.

Initial experiments demonstrate compression to <3-cycle durations and generation of bandwidths broader than half an octave, stretching over 600 nm in the near infrared. The experimental setup comprised a focusing lens, quadratic crystal and recollimating mirror. We propagated ~100-fs, ~10 μJ pulses at wavelengths near 1250 nm from an optical parametric amplifier (OPA) through BBO crystals of lengths varying from 14 mm to 39 mm. The OPA generates transform limited 100-fs pulses near 1250 nm, where there is enough energy to perform the experiment. Pulses from the OPA are focused into the BBO crystal to generate intensities between 100-500 GW/cm$^2$. The beam is recollimated after the doubling crystal with the recollimating mirror and sent to a background-free, multiple-shot autocorrelator with a 100 micron thick BBO crystal.

With 100-fs pulses of only 10-μJ energy available, it was necessary to focus the OPA beam to a narrow waist to achieve sufficient intensity. The resulting diffraction length was not much longer than the necessary propagation length. If the beam waist is too narrow, self-defocusing, which is inversely proportional to the diffraction-limited beam waist, shortens the interaction length. This places a minimum on the pulse power necessary to achieve a given compression ratio. With maximal focusing, our experimental intensity was high enough for compression to few-cycle durations when Δk was set to 6π/mm and lower. At such small Δk, the corresponding peak power versus N curve (as in FIG. 2A) deviates from the unperturbed cubic case at very small N, making it impossible to achieve a high compression ratio without significant Raman-like pulse distortions.

Experiments were conducted to optimize compression results for varying Δk. At 6π/mm, the temporal and spectral profiles were heavily distorted. At larger Δk, temporal pedestals were smaller, and spectral profiles were closer to the unperturbed cubic case.

Simulation results corresponding to the experiments predict a 6-fs soliton spike with a heavily-structured pedestal. The experimental results matched these simulations well: a 110-fs Gaussian pulse at $\lambda_0$=1260 nm was compressed to a 12-fs spike (2.9 optical cycles), with an autocorrelation pedestal as expected. A deconvolution factor corresponding to the expected hyperbolic secant shape of the soliton spike was to determine its width. The spectrum was broadened from 23 nm at FWHM to over 600 nm, which would correspond to an 8-fs transform-limited pulse. Our autocorrelator contains ~20 fs$^2$ of GVD, just enough to broaden an 8-fs pulse by a factor of 1.5, in line with the observed results. The close match between experiment and theory suggests that with higher pulse energy, allowing for wider beam waists and higher Δk, high-quality near-single-cycle pulses such as those in FIGS. 3(a), (b) will be obtained.

Despite shortcomings in experimental operating conditions, proof-of-concept for the applicability of $\chi^{(2)}:\chi^{(2)}$ soliton compression to the generation of few-cycle pulses was demonstrated. In the experiments, three-cycle pulses have been measured and the agreement with numerical simulation strongly indicates that compression to near-single-cycle durations is possible, with initial durations that can be as long as a picosecond. These results are explained by analogy to perturbed soliton compression in cubic media, which provides a route to quantitative optimization criteria. An obstacle still remains in allowing the technique to become an efficient laboratory tool: compression will be spatially inhomogenous if the initial spatial intensity profile is so, since each point on the beam will have its own soliton order and optimal length for compression. A solution to this problem, e.g., use of a flattop beam, is necessary to make full use of available energy.

In summary, the obtained experimental results confirm the remarkable predictions of the simulations: it is possible to obtain large compression ratios with final pulse durations in the few-cycle regime with only a single quadratic nonlinear crystal. There is no fundamental limit to the input pulse energy, and in all cases excellent energy throughput can be obtained.

Although the invention has been disclosed in terms of a preferred embodiment and variations thereon, it will be understood that numerous other modifications and variations could be made thereto without departing from the scope of the invention as defined in the following claims.

The invention claimed is:

1. A method for compressing optical pulses comprising the steps of:
   providing an optical pulsed laser beam comprised of a plurality of optical pulses, each of said optical pulses having a selected initial duration and fundamental wavelength;
   providing a quadratic nonlinear crystal having a known group velocity mismatch (GVM) and a known wavevector mismatch at said fundamental wavelength for inducing temporal self-defocusing and self-compression of said optical pulses;
   calculating a maximum value of perturbation to nonlinear Schrödinger-type soliton compression due to GVM that can be imparted to said optical pulses by said crystal without distorting said optical pulses beyond a predetermined limit, said maximum value of perturbation being calculated as a function of soliton order of said optical pulses, said selected initial duration of said optical pulses, and said GVM and said wavevector mismatch of said quadratic nonlinear crystal at said fundamental wavelength;
   determining a value N of soliton order of said optical pulsed laser beam that provides a perturbation value that equals said maximum value of perturbation;
   adjusting an intensity of said optical pulsed laser beam to adjust the soliton order of said optical pulsed laser beam to N; and
   passing said optical pulsed laser beam through said quadratic nonlinear crystal to induce temporal self-defocusing and self-compression of said optical pulses.

2. The method of claim 1, wherein said crystal is selected to be made of a material which has a predetermined small value of GVM and a predetermined large value of wavevector mismatch at said fundamental wavelength of said optical pulses to facilitate temporal compression of said optical pulses.

3. The method of claim 2, wherein the value N of the soliton order and the material forming said crystal are selected to provide temporal compression of said optical pulses to durations of 3 optical cycles or less.

4. The method of claim 2, wherein said maximum value of perturbation defines a value above which distortion caused by said perturbation at a given soliton value reduces peak power in said optical pulses by an amount more than an amount that compression of said optical pulses at said given soliton value increases the peak power of said optical pulses.

5. The method of claim 1, wherein said pulsed laser beam is passed through a quadratic nonlinear crystal formed from a material selected from the group comprising barium metaborate (BBO), bismuth borate (BiBO), potassium titanyl phosphate (KTP), lithium iodate (LiIO3), lithium niobate (LiNbO3), periodically-poled lithium niobate (PPLN), potassium niobate (KNbO3) and lithium triborate (LBO).

* * * * *